United States Patent
Chen et al.

(10) Patent No.: US 8,761,998 B2
(45) Date of Patent: Jun. 24, 2014

(54) HIERARCHICAL RECOGNITION OF VEHICLE DRIVER AND SELECT ACTIVATION OF VEHICLE SETTINGS BASED ON THE RECOGNITION

(75) Inventors: Shih-Ken Chen, Troy, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 13/473,118

(22) Filed: May 16, 2012

(65) Prior Publication Data

US 2012/0226413 A1 Sep. 6, 2012

Related U.S. Application Data

(63) Continuation-in-part of application No. 12/691,968, filed on Jan. 22, 2010.

(60) Provisional application No. 61/173,881, filed on Apr. 29, 2009.

(51) Int. Cl.
*G06F 7/00* (2006.01)
*G06F 7/02* (2006.01)
*G06F 7/76* (2006.01)

(52) U.S. Cl.
CPC .... *G06F 7/02* (2013.01); *G06F 7/76* (2013.01)
USPC .............................................. 701/36; 701/49

(58) Field of Classification Search
CPC ............. G06F 5/01; G06F 7/02; G06F 7/026; G06F 7/22; G06F 7/06; G06F 7/76; G06F 9/00; G06F 9/06; G06F 9/44; G06F 9/4401; G06F 9/4403; G06F 9/4405; G06F 9/4406
USPC ........... 701/23, 36, 45, 49, 51, 400, 537, 538, 701/539
See application file for complete search history.

(56) References Cited

U.S. PATENT DOCUMENTS

| | | | |
|---|---|---|---|
| 6,617,707 B1 | 9/2003 | Reece | |
| 6,810,309 B2 * | 10/2004 | Sadler et al. | 701/1 |
| 7,019,623 B2 | 3/2006 | Klausner et al. | |

(Continued)

FOREIGN PATENT DOCUMENTS

| | | |
|---|---|---|
| JP | 2006184103 | 7/2006 |
| KR | 2010040554 A | 4/2010 |

*Primary Examiner* — Ricahrd Camby
(74) *Attorney, Agent, or Firm* — Parks IP Law LLC; Mickki D. Murray, Esq.

(57) ABSTRACT

A process for identifying a vehicle driver according to a pre-determined hierarchy. The process includes determining, in a first determination act, whether a first sub-process, of a group of multiple sub-processes, can be used to identify the vehicle driver. The first sub-process is pre-determined to be a most reliable sub-process of the group for identifying the vehicle driver. The process also includes determining, in a second determination act, only if the first determination act has a negative result, whether a second sub-process of the group can be used to identify the vehicle driver. The second sub-process is pre-determined to be a second-most reliable sub-process of the group for identifying the vehicle driver.

20 Claims, 6 Drawing Sheets

(56) References Cited

U.S. PATENT DOCUMENTS

| | | |
|---|---|---|
| 7,072,753 B2 | 7/2006 | Eberle et al. |
| 7,171,026 B2 | 1/2007 | Shinada et al. |
| 7,477,970 B2 * | 1/2009 | Bruelle-Drews ............... 701/36 |
| 7,685,162 B2 * | 3/2010 | Heider et al. ................. 707/802 |
| 2003/0032460 A1 | 2/2003 | Cannon et al. |
| 2006/0155439 A1 | 7/2006 | Slawinski et al. |
| 2006/0241836 A1 | 10/2006 | Kachouh et al. |
| 2007/0044037 A1 | 2/2007 | Amari et al. |
| 2009/0192705 A1 | 7/2009 | Golding et al. |
| 2010/0087987 A1 | 4/2010 | Huang et al. |
| 2010/0148920 A1 | 6/2010 | Philmon et al. |
| 2010/0174479 A1 | 7/2010 | Golding et al. |

\* cited by examiner

HIERARCHICAL RECOGNITION OF VEHICLE DRIVER AND SELECT ACTIVATION OF VEHICLE SETTINGS BASED ON THE RECOGNITION

CROSS REFERENCE TO RELATED APPLICATIONS

This application is a continuation-in-part of U.S. patent application Ser. No. 12/691,968, which was filed Jan. 22, 2010, and claims the benefit of the Apr. 29, 2009 priority date of U.S. Provisional Patent Application No. 61/173,881, which are incorporated herein in their entireties.

BACKGROUND OF THE DISCLOSURE

1. Field of the Technology

This technology relates generally to a system and a method for identifying a driver of a vehicle and, more particularly, to a system and a method for identifying a driver according to a pre-established hierarchy and performing a function, such as setting a parameter for one or more vehicle devices, based on the identification.

2. Discussion of Related Art

Modern vehicles typically allow a driver to adjust various vehicle devices such as mirrors, seats, pedals, radio, etc. Personalizing device positions can enhance safety and comfort. Some vehicles further store the settings, or pre-sets, in a group or profile so that the driver can later select the group to automatically activate the previously established settings.

Storing pre-sets provides a convenience factor, but still requires the driver to perform some operation, such as pressing a button, for the system to recognize the driver.

SUMMARY OF THE DISCLOSURE

The present technology includes, in accordance with an embodiment of the present disclosure, a process for identifying a vehicle driver according to a pre-determined hierarchy. The process includes determining, in a first determination act, whether a first sub-process, of a group of multiple sub-processes, can be used to identify the vehicle driver. The first sub-process is pre-determined to be a most reliable sub-process of the group for identifying the vehicle driver. The process also includes determining, in a second determination act, only if the first determination act has a negative result, whether a second sub-process of the group can be used to identify the vehicle driver. The second sub-process is pre-determined to be a second-most reliable sub-process of the group for identifying the vehicle driver. In one embodiment the process includes a third determination act, in a similar manner (performed only if the first and second determination acts had negative results, wherein the third sub-process is pre-determined to be a third-most reliable sub-process of the group for identifying the vehicle driver). In a further embodiment, the process further includes a fourth determination, in a similar manner. In still a further embodiment, the process further includes a fifth determination, in a similar manner.

The present technology also includes, in accordance with an embodiment of the present disclosure, a computer-readable medium (e.g., computer memory) having instructions causing a processor to perform the process of the preceding paragraph.

The present technology also includes, in accordance with an embodiment of the present disclosure, a system including the processor and computer-readable medium of the preceding paragraph.

Additional features of the present technology will become apparent from the following description, the accompanying drawings, and the appended claims.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Modern vehicles are becoming increasingly capable of recognizing or accepting various types of driver-identifying inputs. Example inputs are biometric inputs (e.g., voice) and inputs from wireless devices (e.g., input from BLUETOOTH® devices), such as cellular telephones, laptops, personal data assistants (PDAs), etc (BLUETOOTH is a registered trademark of BLUETOOTH SIG, Inc., of Bellevue, Wash.). BLUETOOTH is a communications protocol that allows a device to be wirelessly connected to another device. Wireless devices transmit a unique identification signal that is read by the receiving device to identify it.

In various embodiments, the present disclosure describes a system and a method for identifying a driver using one of various inputs from a driver device and/or from the driver. In some embodiments, the identification is preferably performed according to a pre-established hierarchy by which each of the various inputs and corresponding determinations has a preference level with respect to the other inputs and determinations. For example, it is preferred to identify a driver based on identifying information received from a personal device of the driver, such as a mobile phone, over identifying the driver based only on a particular entry device (e.g., key fob) used to access the vehicle. In a particular embodiment, at least one of the inputs is sought and/or accepted only in response to the system determining that one or more high-priority inputs are not available or satisfactory for identifying the driver at the time.

System Overview and General Capabilities

Figure 1:
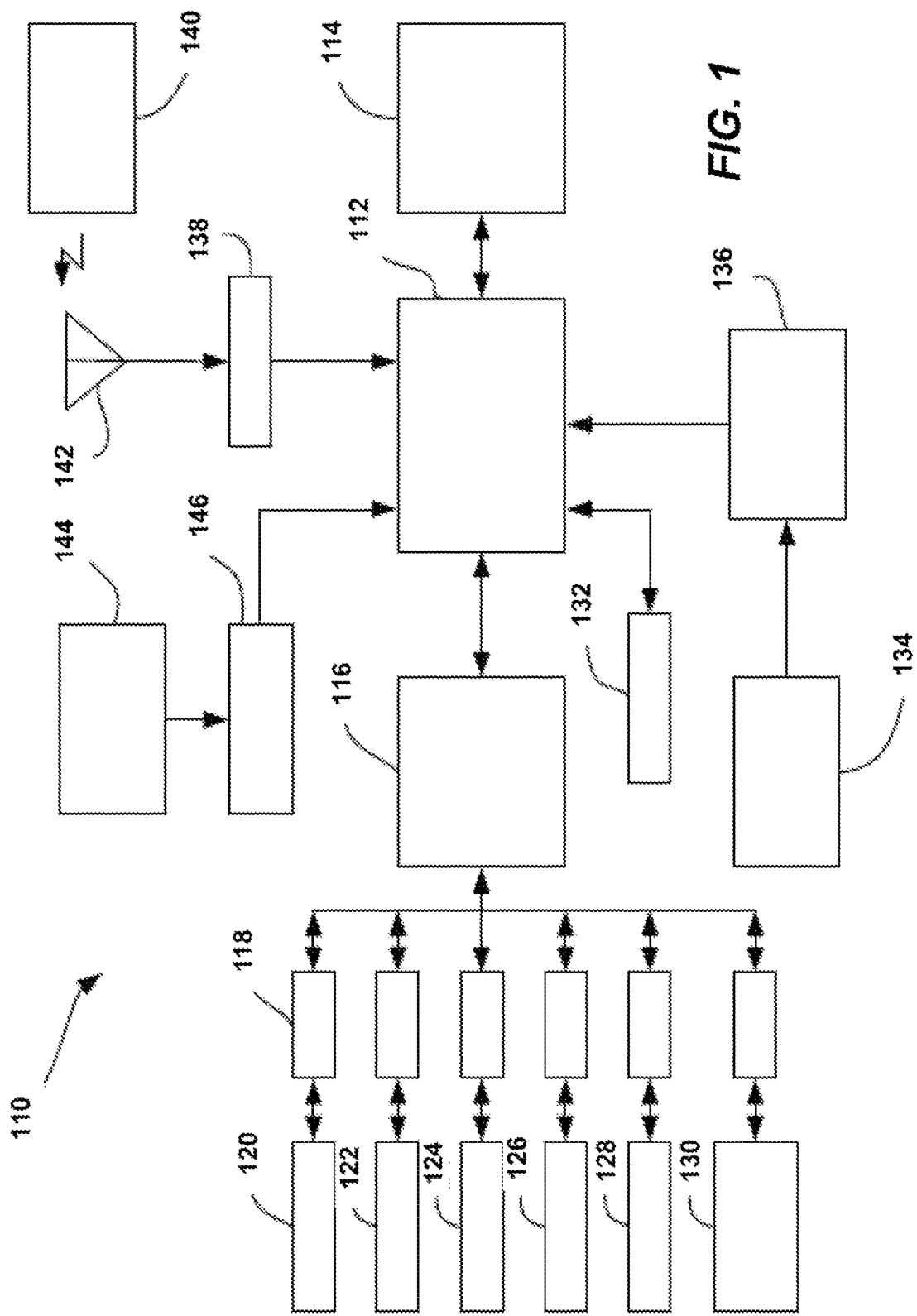
FIG. 1 is a block diagram of a driver identification system of a vehicle for identifying a driver of the vehicle, according to a pre-established hierarchy, and performing a function, such as setting a parameter for one or more vehicle devices, based on the identification.

FIG. 1 is a block diagram of a system 110 for identifying a vehicle driver and then activating or positioning one or more vehicle devices components in response thereto. The system 110 includes a driver identification and function management computing device 112 including a processor. In some particular embodiments, the function being managed includes settings, and the device 112 can be referred to as a driver identification and settings management computing device. While the device can include more than a processor, reference numeral 112 is used herein at times in connection with the processor of the device.

While the driver identification resulting from the present technology is described primarily herein for use in setting one or more parameters (or settings) of one or more vehicle devices or components (e.g., radio, seats, mirrors), it will be appreciated that the driver identification can be used for other purposes. For instance, the driver identification can be used in emergency and non-emergency customer-service situations, such as by a remote computer server and/or personnel of the OnStar® customer service system (OnStar is a registered trademark of OnStar, LLC, a subsidiary of the General Motors Company), the vehicle itself, and/or public-service entities (e.g., police).

Another benefit of identifying the driver is increased security. For instance, the vehicle can be programmed to disable the vehicle, or otherwise not operate in one way or another, if the driver is not determined to be a known (e.g., assigned) or authorized/permitted driver. The same disablement or affect of operation can be performed by a remote device, such as an OnStar® computer, automatically or with interaction from personnel. These features can help prevent theft and other unauthorized use of the vehicle, such as by a child of an owner having access to the vehicle key fob.

Another benefit of the present technology is potential cost savings in vehicle manufacturing and/or maintenance. The savings could result from the elimination of some hardware required for identifying each driver, such as hardware of the vehicle and/or hardware associated with the key fob.

The system 110 includes at least one computer-readable storage memory 114. Although the memory 114 is shown separate from the computer device 112, in some embodiments, at least one part of the memory 114 is a part of the computer device 112.

The system 110 receives signals from various vehicle sub-systems used to identify the driver and provides signals to various vehicle devices, also referred to at times herein as components, and sub-systems for setting the devices to a desirable or recommended setting for the identified driver. The system 110 is capable of storing distinct settings for multiple vehicle drivers who may operate the vehicle.

Settings for one or more devices and sub-systems are stored in a driver profile database. The driver profile database is in some embodiments a part of the same memory described above, and so is indicated by the same reference numeral 114. The settings, themselves, are not illustrated expressly in the figures but are considered shown constructively via illustrations of the database 114 comprising them.

The settings can be stored in the driver profile database 114 by the driver identification and setting management processor 112. The vehicle driver can control the processor 112 to input pre-set or other information, or change settings through a human-vehicle interface (HVI) 132.

As referenced, the driver can be identified by various vehicle device or sub-system settings. As a first example, identifying the driver by vehicle settings is described. The driver can be identified by one or more of the position or settings of a vehicle device such as, but not limited to, a vehicle mirror 120, a driver seat 122, a pedal 124, a steering wheel 126, a radio setting 128, and an HVAC or climate-control setting 130.

In one embodiment, settings for these devices are sent to a corresponding local control module (LCM) 118 for interacting with the devices. In a particular embodiment, there are multiple LCMs, such as one for each device, as exemplified in FIG. 1.

The LCM 118 sends signals indicating a position and/or setting of the respective device(s) to a body control module 116. The body control module can include hardware and/or software stored on hardware, such as the aforementioned computer-readable medium 114.

The position and/or setting signal(s) is/are sent to the processor 112. In one embodiment, the signal(s) are sent to the processor 112 by the body control module 116 in response to the BCM 116 receiving the signal(s). The processor 112, in some aspects of the present technology, uses the one or combination of signals to determine which driver is currently in the vehicle, as described further below. Information about which settings go with which driver are stored in the database 114.

As another way to identify the driver, at least one biometric sensor 134 of the system 110 can be used. The sensor 134 can include one or more device such as a camera, a microphone for voice-recognition [e.g., biometric voice analysis (e.g., regarding the vocal tract of the person) and/or speech analysis (e.g., regarding the way a person talks)], gesture-detection, salinity sensor, etc., can be used to identify the vehicle driver in various ways.

Signals received by biometric sensors 134 identifying the driver are sent to a biometric ID module 136 that uses the signals to identify the driver. The determined identification is then sent to the processor 112 to be processed, which processing may include storing the determined identification in the database 114 and/or changing settings of one or more of the vehicle devices to custom states for the identified driver.

As another way to identify the driver, the system 110 processes information received from a wireless device. For this embodiment, the system 110 include a wireless transceiver (or just receiver) 138 and antenna 142 that receive wireless communications from one or more wireless devices 140, such as a device using the BLUETOOTH communications protocol. Signals received from the wireless device 140 include a unique identification (ID) that is sent to the processor 112 to identify the driver. The unique ID is associated with the device and/or a particular vehicle driver and is in some embodiments stored in the driver profile database 114 so that the processor 112 can identify the driver by the unique ID from the wireless device 140. An HVI 132 can be used by the driver to go through a registration/recording process for a particular ID associated with a wireless device 140 and, e.g., store a resulting association between the driver and the ID, so that the processor 112 will identify the driver upon receipt of the ID.

In a contemplated embodiment, the processor 112 can operate to identify the driver by, in part, accessing, via longdistance communication (e.g., satellite or cellular communication) a remote database, such as a database of the OnStar® system.

Alternately, or in addition, a device carried by the vehicle driver may be an electronic device 144 configured for hard-wired connection to the vehicle, such as an MP3 player configured for such connection. In operation, the device 144 is connected to a vehicle port, such as a USB port. The device 144 would transmit a signal having a unique ID, to the vehicle, identifying the driver and/or device. The signal would be detected by an ID probe 146 of the vehicle. The ID probe 146 sends a signal indicating the ID to the processor 112 which then accesses the driver profile database 114 to identify the vehicle driver associated with that device.

An HVI 132 can be used by the vehicle driver to go through a recording/registration process for the particular ID associated with the wired device and, e.g., store a resulting association between the driver and the ID, so that the processor 112 will identify the driver upon receipt of the ID.

Once a particular vehicle driver is identified using the wireless device 140 or the hard-wired device 144, the driver profile can be accessed from the database 114 for any suitable purpose. For example, the processor 112 can send signals to the body control module 116 to control the settings of one or more of various vehicle devices and sub-systems. The body control module 116 disperses the signals to at least one or more LCMs 118 for controlling the one or more devices or sub-systems, such as the vehicle mirror 120, the driver seat 122, the pedal 124, the steering wheel 126, the radio 128, and the HVAC or climate control 130, or even to allow the driving of the vehicle. Regarding the latter, the BCM 116 in one embodiment sends a signal to an LCM affecting vehicle operation, such as an ability of the vehicle to start or be put into a driving gear. It is also contemplated that the processor 112 could send any of the signals described in this paragraphs, e.g., without use of BCMs 116.

In response to identifying a particular vehicle driver, other vehicle systems or devices can also be controlled by the body control module 116, such as vehicle suspension tuning, human/machine interface (HMI) settings, such as a default display thereof, etc. It is noted that the above-identified devices and sub-systems are by way of non-limiting examples in that any suitable vehicle system can be controlled for a particular driver when that driver is identified.

Hierarchical Algorithm

Figure 2:
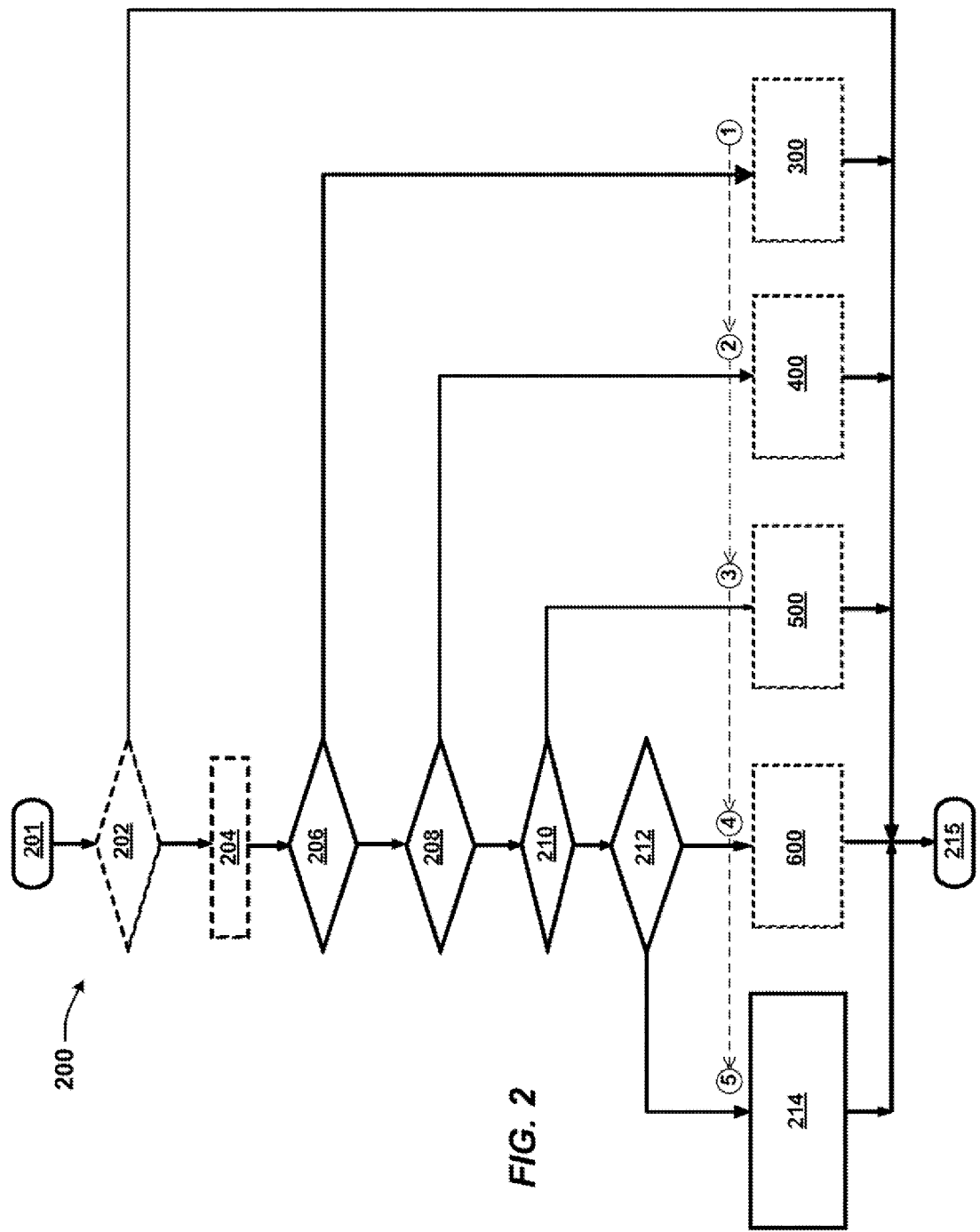
FIG. 2 is a flow chart showing a process for identifying a driver of the vehicle, according to a pre-established hierarchy.

FIG. 2 shows an exemplary algorithm, or method 200 of operation of the technology of the present disclosure. For each method described herein (e.g., methods 200, 300, 400, 500, and 600), the steps thereof are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated methods can be ended at any time.

In certain embodiments, some or all steps of the processes, and/or substantially equivalent steps are performed by a system, such as the systems described herein, or more particularly by one or more processors, such as a processor described herein (e.g., the processor 112 described herein), executing computer-readable instructions stored or included on at least one non-transitory computer-readable storage medium (e.g., the memory 114 and/or other memory of the system 110).

Start of Algorithm

The method 200 of FIG. 2 starts 201 and flow proceeds to decision diamond 202 whereat a processor, executing computer-readable instructions, determines whether a signal is received from an entry device, such as an electric entry device. The personal entry device can be, for example, a key fob, a smart phone, a numeric key pad of the vehicle, etc.

If at diamond 202 a signal from an entry device is not received, e.g., if a person is not trying to enter the vehicle, flow of the method 200 proceeds to repeat or end 215. In some implementations, the entry device can be the same device as the personal entry device described elsewhere herein, such as below in connection with decision act 208. In one contemplated embodiment, the algorithm does not include decision 202, and flow proceeds from the start 201 to decision 206.

In one contemplated embodiment, flow proceeds from start 201 to the act 204 of confirming entrance to the vehicle. Confirmation for act 204, when not based on a signal from an entry device, can be based, e.g., on another input device, such as a seat weight sensor or motion sensor indicating when a person has entered the vehicle, generally, or accessing the driver seat in particular.

If at diamond 202 of FIG. 2 a signal from an entry device is received, flow of the algorithm proceeds to block 204 whereat entry to the vehicle, e.g., to the driver position, is confirmed. Confirming that a person has entered the vehicle and, more particularly the driver seat, can be accomplished in any one or more of a variety of ways without departing from the scope of the present disclosure. As an example, the driver seat (seat base and/or back) can include a weight sensor that provides a signal to the processor in response to sensing a sufficient amount of weight on the seat. As another example, an infrared or other type of camera can be used to determine whether a driver is in the driver seat.

Entry confirmation in some contemplated embodiments includes determining that an act, in addition to or instead of a person occupying the driver seat, has occurred, such as inserting a vehicle key into an ignition of the vehicle, starting the vehicle, or simply activating or using (e.g., adjusting) a device of the vehicle such as the radio.

For some of the embodiments of the technology having an entry-confirmation act 204, until entry is confirmed, flow of the method 200 does not proceed, or proceeds to repeat, to the start 201, or to the end 215 of the method 200. While act 204 is shown as a block in FIG. 2, in some embodiments the act may more appropriately be a decision diamond because flow can proceed from there down more than one path based on at least one factor considered in the act 204.

In a contemplated embodiment, the processor will hold or repeat at block 204, awaiting confirmation of entry, until a particular trigger is met, such as one of receiving an entry-confirmation signal or passing of a pre-determined time period. One purpose of entry-confirmation is that the system 110 can save resources (e.g., processing ability, power, wear on parts, etc.) by not performing further functions related to identifying the driver and to adjusting vehicle devices until needed. For instance, a person, such as a family member of a driver, may access the vehicle, but only to reach in to retrieve an item from the vehicle, not to drive it. In this scenario, by not performing further functions related to identifying the driver and adjusting vehicle devices, the system 110 saves resources.

According to the hierarchical approach of the present technology, the computer-executable instructions are configured to cause the processor to seek to identify the driver properly using a sub-process, of multiple available sub-processes, having the highest reliability. A programmer of the instructions pre-determines the hierarchy and configures the instructions so that each sub-process pre-determined to be more likely than another sub-process to accurately identify the actual driver is performed prior to performance of the other, less reliable sub-process. In some embodiments, each sub-process is performed only after any and all sub-processes of higher reliability have been determined unavailable, or presently unable to be used for identifying the driver.

In addition to the benefits associated with identifying a driver with higher accuracy, and avoiding mis-identifications, it is contemplated that the present technology could further save vehicle resources by accurately identifying the driver. The savings can result from the system 110 identifying the driver using a highest reliable sub-process available at the time, and so not needing to perform or even initiate any of the sub-processes of lower reliability.

In an exemplary embodiment of the hierarchical approach of the present technology, the method 200 includes four sub-processes. With continued reference to FIG. 2, the five sub-processes can be identified generally as follows: (1) sub-process 300; (2) sub-process 400; (3) sub-process 500; (4) sub-process 600, and (5) sub-process (or act or function) 214.

This list of sub-processes is presented according to the hierarchy whereby it is most preferred to identify the driver according to the first sub-process 300 of the five sub-processes of this exemplary embodiment. It is next (second) most preferred to identify the driver according to the second sub-process 400 in this exemplary embodiment. And it is next (third) most preferred to identify the driver according to the third sub-process 500. It is next (fourth) most preferred to identify the driver according to the fourth sub-process 600. Finally, it is next (fifth) most preferred to identify the driver according to the last sub-process 214 of the five options, which is viewed as the least reliable way to identify the driver of the five of this embodiment. The hierarchy is illustrated in FIG. 2 by the circled numbers, (1), (2), (3), (4), and (5), whereby, as shown by the circled numbers in FIG. 2, the five sub-processes are shown according to increasing priority from left to right.

While one or more driver profiles can be associated with a remote-entry device, as described further below (see e.g., act 214), and so used to identify the driver, identifying the driver using the remote-entry device is in some embodiments considered least reliable because of the ease or likelihood with which various persons will use the same remote-entry device. For instance, a husband borrowing his wife's vehicle to run an errand could use her key fob or key, and so the vehicle would incorrectly identify the driver as the wife based on the wife's key fob or key being used to access the vehicle.

For embodiments of the technology having an entry-confirmation act 204, upon confirmation of entry, flow of the algorithm of FIG. 2 proceeds from act 204, or from the start 201 in embodiments in the earlier-mentioned decision 202 is not performed, to decision diamond 206.

Decision 206

At diamond 206, the processor determines whether identifying biometric information has been received from the driver. As described above, the vehicle can include at least one biometric sensor 134, such as a camera, sound-sending system (microphone, etc.) for voice-recognition, salinity sensor, etc., providing identifying signals, and a biometric ID module 136 that uses the signals to identify the driver.

In one contemplated embodiment, biometric input can be provided to or sensed by a non-vehicle device, such as a mobile phone or a garage-wall-mounted sensor, and communicated from there to the vehicle. As provided, the vehicle system 110 can receive external signals, such as from such non-vehicle device, by wire at a vehicle port (e.g., USB port) or by wireless communications at the wireless transceiver 138 and antenna 142.

In some embodiments, the driver can provide the biometric input unsolicited by the vehicle. In some embodiments, the driver can provide the biometric input unsolicited or in response to solicitation, such as an inquiry. In one embodiment, the vehicle senses biometric characteristics without the driver needing to take any actions. The sensing can be unbeknownst to the driver.

If there is a positive result at decision diamond 206 (e.g., identifying biometric information is obtained or generated), flow of the algorithm proceeds down an affirmative branch from the diamond to process 300 which is described more below in connection with FIG. 3.

If there is a negative result at decision diamond 206, and in some embodiments only if such negative result is reached at diamond 206, flow of the method 200 proceeds down a negative branch from the diamond 206 to decision diamond 208. A negative result at diamond 206 is reached in one or more of a variety of ways depending on the embodiment.

A negative result is reached in one embodiment if biometric feedback is not detected within a pre-determined amount of time, such as a pre-determined number of seconds following confirmation of entry at block 204. In one embodiment, a negative result is reached if a scanning signal, transmitted by the vehicle, seeking biometric information from a driver (e.g., salinity via steering-wheel, gear-shift, or other salinity sensor, voice, face, retina/iris, fingerprint, etc.), does not pick up biometric information (e.g., within a pre-determined amount of time). In a particular embodiment, the scanning function is performed a pre-determined number of times, or for a pre-determined amount of time, and the negative result is reached if such response is not received in reply to the scannings.

In one embodiment, a negative result is reached if an enquiry provided by the vehicle is not responded to with a qualifying biometric input from the driver. The enquiry can include, for instance, presenting a question and/or instruction to the driver, such as presenting, by way of a touch-screen HVI or a speaker, a question like, "Would you like to provide biometric information to identify yourself for personalizing vehicle settings?", or an instruction like, "You may now identify yourself for personalizing vehicle settings using biometric input" or "Please identify yourself using biometric input for personalizing vehicle settings." In a particular embodiment, the processor determines that a result of the decision of diamond 206 is negative if a response, or qualifying biometric input in response, to such an enquiry and/or instruction is not received within a pre-determined amount of time.

Decision 208

At decision diamond 208, the processor determines whether a device personal to the driver is present. Example personal devices include, but are not limited to, the wireless or wire-connectable devices 140, 144 described above in connection with FIG. 1. The devices can be, for instance, a cellular telephone, a laptop or tablet computer, or an MP3 player communicating wirelessly, such as via the BLUETOOTH® protocol, or by wire. As also referenced above, determining that a personal device is present includes receiving a signal from the respective device by way of a personal device-vehicle interface such as the antenna/transceiver 142, 138 or the ID probe 146 including or associated with a port (e.g., USB port of the vehicle).

If, at decision diamond 208, the processor determines that a personal device is present, flow proceeds down an affirmative branch from the diamond to sub-process 400. This sub-process 400 is described in further detail below in connection with FIG. 4.

If there is a negative result at decision diamond 208, and in some embodiments only if such negative result is reached at diamond 208, flow of the method 200 proceeds down a negative branch from the diamond 208 to decision diamond 210. A negative result at diamond 208 is reached in one or more of a variety of ways depending on the embodiment.

In one embodiment, a negative result is reached at decision 208 if a personal-device signal (e.g., BLUETOOTH®) is not detected within a pre-determined amount of time, such as a pre-determined number of seconds following confirmation of entry at block 204. In one embodiment, a negative result is reached if a scanning signal transmitted by the vehicle is not responded to by a personal device (e.g., within a pre-determined amount of time). In a particular embodiment, the scanning function is performed a pre-determined number of times, or for a pre-determined amount of time, and the negative result is reached if such response is not received in reply to the scannings.

Decision 210

At diamond 210, in response to the negative result at diamond 208, the processor determines whether the driver has provided input to the vehicle that can be used to identify the driver. As referenced above, the vehicle in various embodiments has at least one human-to-vehicle interface (HVI) for receiving driver input and/or providing information the driver. Example HVIs include a touch-screen display, a keypad, a voice sub-system including a speaker/microphone for providing/receiving information to/from the driver, and a card reader (in a contemplated embodiment, such card is considered by the present algorithm (e.g., processor executing the computer-executable instructions) as a personal device and so, upon being detected at diamond 208, would be processed at sub-process 400).

If, at decision diamond 210, the processor determines that an HVI is present, flow proceeds down an affirmative branch from the diamond to sub-process 500. This sub-process 500 is described in further detail below in connection with FIG. 5.

If there is a negative result at decision diamond 210, and in some embodiments only if such negative result is reached at diamond 210, flow of the method 200 proceeds down a negative branch from this diamond 210 to decision diamond 212.

A negative result at diamond 210 is reached in one or more of a variety of ways depending on the embodiment. A negative result is reached in one embodiment if input from the driver is not detected within a pre-determined amount of time, such as a pre-determined number of seconds. The time is in one contemplated embodiment measured from the confirmation of entry at block 204 and in another contemplated embodiment measured from a time that the negative decision is made at diamond 208.

In one embodiment, a negative result is reached at decision 210 if an enquiry provided by the vehicle is not responded to by the driver. The enquiry can include, for instance, presenting a question and/or instruction to the driver, such as presenting, by way of a touch-screen HVI or a speaker, a question like, "Would you like to identify yourself for personalizing vehicle settings?", or an instruction like, "You may now identify yourself for personalizing vehicle settings" or "Please identify yourself for personalizing vehicle settings." In a particular embodiment, the processor determines that a result of the decision of diamond 210 is negative if a response to such an enquiry and/or instruction is not received within a pre-determined amount of time.

Decision 212

In this act 212, in response to the negative result at diamond 210, the processor determines whether a settings readjustment sub-process 600 should be performed. Driver personal settings can be pre-programmed into the vehicle (e.g., the database 114) in connection with a personal profile. In one embodiment, at decision 212, the processor determines whether one or more such personal profiles are programmed in (e.g., activated in) the system (e.g., system 110). The subsequent sub-process 600 is described further below in connection with FIG. 6.

If, at this act 212, the processor determines that the settings readjustment sub-process should be performed (e.g., determines that at least one personal profile is present), flow proceeds down an affirmative branch from the diamond 212 to the sub-process 600.

If, at decision diamond 212, the processor determines that the settings readjustment sub-process should not be performed (e.g., determines that at least one personal profile is not present), flow proceeds to block 214 whereat the processor identifies the driver based on the remote entry device used to enter the vehicle. This identification can include identifying as the driver the person associated in the vehicle memory (e.g., the memory 114) with the remote entry device.

First Sub-Process—Biometric Processing

Figure 3:
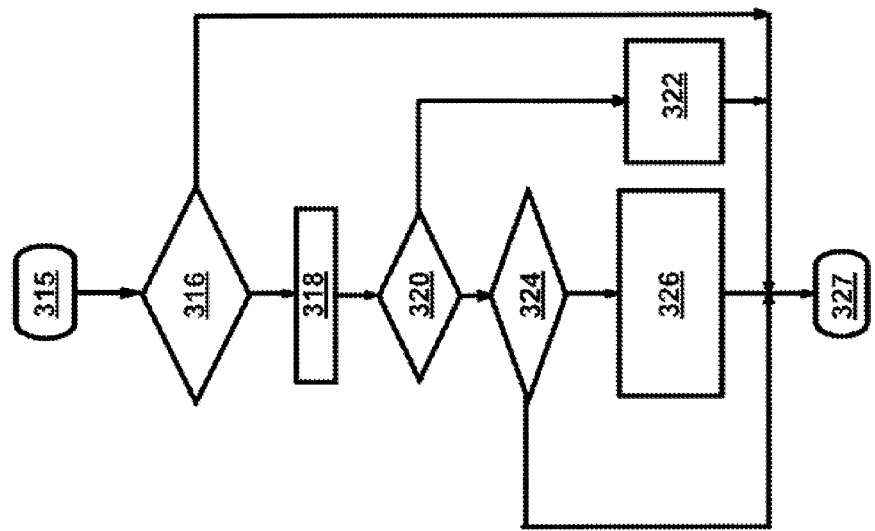
FIG. 3 is a flow chart showing a sub-process, of the process of FIG. 2, for identifying a driver based on biometric input from the driver.
Figure 3:
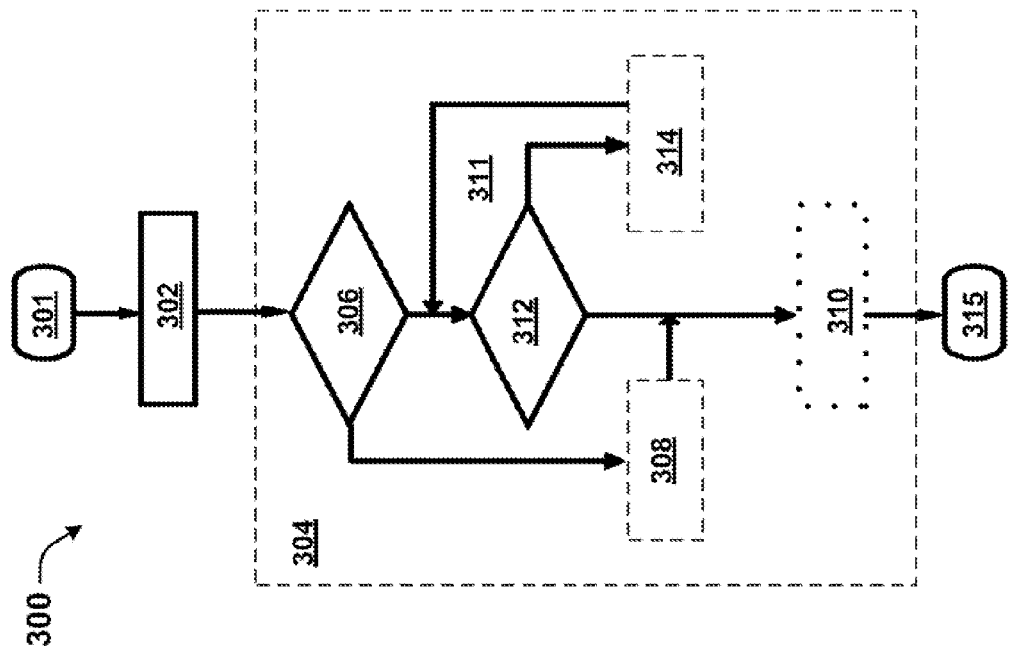

FIG. 3 shows an exemplary sub-process 300, of the method 200 of FIG. 2, for processing biometric information, and interacting with the user, for identifying the driver of the vehicle. The sub-process 300 starts 301 and flow proceeds to an optional block 302 whereat a processor, executing computer-readable instructions, presents a greeting to the driver. The greeting can be made by way of any HVI, such as a display screen or speaker sub-system.

At block or sub-routine 304, the processor determines whether the biometric input matches a profile already existing in the system (e.g., the system 110, particularly the database 114).

It will be appreciated that, depending on the type of biometric input, the vehicle could receive more than one biometric input in a time period, such as the same type of input (e.g., voice) from more than one person, such as from a driver and passenger, or such as voice, facial, and salinity information from the same person. At decision 306, the processor determines whether a single or multiple biometric inputs are received.

If the processor detects biometric information from only one person at block 306, flow proceeds to block 308, whereat the processor processes the sole input to determine whether the biometric input matches one already stored in the system.

In response to the system 110 having performed the processing of block 308, flow proceeds to block 310, whereat the processor identifies the driver preliminarily based on the information available at the system 110.

If the processor detects multiple personal devices at the decision diamond 306, flow proceeds to a processing loop 311. The processing loop 311 includes a determination 312 of whether there is any more biometric input received. If the processor determines at diamond 312 that there is another biometric input to process; flow proceeds in the loop 311 to a routine including processing the particular biometric input of the present iteration of the loop 311, at block 314, which can be like block 308.

In response to the processor determining, after the acts of the loop 311 are performed (e.g., performed a few times, or iterations), that there are no other biometric input, then flow proceeds from diamond 312 to block 310, whereat, as mentioned above, the processor identifies the driver temporarily based on the biometric information received. If the biometric inputs are all received from the same person—e.g., the processor determines that received voice input and salinity input match the same existing profile, then the system identifies the driver preliminary at block 310 as that person.

If the biometric inputs are received from more than one person, the processor can, in any of a variety of ways, determine which person is most likely the driver. In one embodiment, the vehicle is configured with a sensing sub-system that can estimate where a person providing the input (e.g., voice) is positioned—e.g., driver or passenger side. For instance, a voice-system can detect, e.g., by directional microphones and/or multiple microphones, a general direction and/or location from which the voices are coming from. Similar direction and/or location-determining capabilities can be provided by sensor sub-systems other than voice-systems [e.g., gesture recognition (GR) sub-system including, e.g., GR sensor (e.g., camera)] in a similar manner. The system would consider the person determined to be positioned in or closer to the driver seat to be the expected driver.

Upon identification of a driver at block 310, whether via block 308 or 314, flow of the algorithm proceeds to an end and transfer point 315. As also shown in FIG. 3, from the transfer 315, flow continues to decision diamond 316.

At decision diamond 316, the processor determines whether to reselect a driver. In one embodiment, the determination includes presenting an enquiry to the driver as to whether the driver would like the system 110 to reselect a driver—e.g., from a default or preliminarily (up-to-this-point) identified driver, such as a driver identified in act 310. The enquiry can be presented by way of any HVI, such as a touch-screen display or speaker/microphone sub-system. The act can include communicating the default or preliminarily identified driver so that the driver can determine whether to request or instruct the system 110 to reselect.

If the processor determines at diamond 316 to not reselect a driver, flow proceeds to an end 327 of the sub-process 300, and thus returns to the primary method 200. The driver already identified (e.g., in act 310) is the driver that the system 110 determines is the current driver, and the method 200 proceeds to end 215.

If the processor determines at diamond 316 to reselect a driver, flow proceeds to block 318 whereat the processor presents a select-driver option. The option can include, e.g., a driver-selection page presented via a touch-screen display, or driver choices presented via a speaker of a speaker/microphone sub-system. The option may include a list of one or more drivers stored in the memory 114. The list may be presented, for example, by way of a menu type of list presented via screen, or a list of one or more pre-stored drivers presented via speaker. In one embodiment, the processor allows the driver to select from such a list. In one embodiment, in addition or in the alternative, the process allows the driver to input, e.g., via an HVI, driver information, such as their name.

In response to the user indicating their identity at block 318, flow proceeds to diamond 320 whereat the processor determines whether the indicated identity is associated with existing driver account in the system 110, particularly existing driver account in the memory 114. If at decision block 320, the processor determines that the indicated identity is new (i.e., not associated with an existing driver), flow proceeds to a routine, referenced by block 322, for creating a new driver identification, for the driver, in the system 110, particularly in the memory 114. The routine 322 can be generally the same as the routine 412 described further below in connection with its exemplary acts 419-433, shown by the flow at right of FIG. 4.

Following performance of the sub-routine 322, for creating a new driver identification, flow proceeds to the end 327 of the sub-routine, and the end 215 of the method 200, for implementing settings stored in the memory 114 in connection with the new driver.

If at decision block 320, the processor determines that the indicated identity is not new (i.e., is associated with an existing driver), flow of the sub-process 300 proceeds to decision diamond 324. At the decision 324, the processor determines whether the user is authorized to assign a driver profile in, or select a driver profile from, the system 110 for present use. This function can protect against, for instance, a teenager, allowed to use a parents' car but not allowed to change settings or change or create driver accounts, doing so. Authorization can be received from the driver via an HVI and can include requirement of a secret code, such as a password.

If at diamond 324 the processor determines that the driver is not authorized, flow proceeds to the end 327 of the sub-routine, and the end 215 of the method 200, for implementing settings stored in the memory 114 in connection or association with the driver identified prior.

If at diamond 324 the processor determines that the driver is authorized to select a new driver in the system 110, flow proceeds to block 326 whereat the processor reports the re-selected driver to a driver ID controller.

From block 326, flow proceeds to the end 327 of the sub-routine, and the end 215 of the method 200, for implementing settings stored in the memory 114 in connection or association with the driver re-selected.

Second Sub-Process—PD Processing

Figure 4:
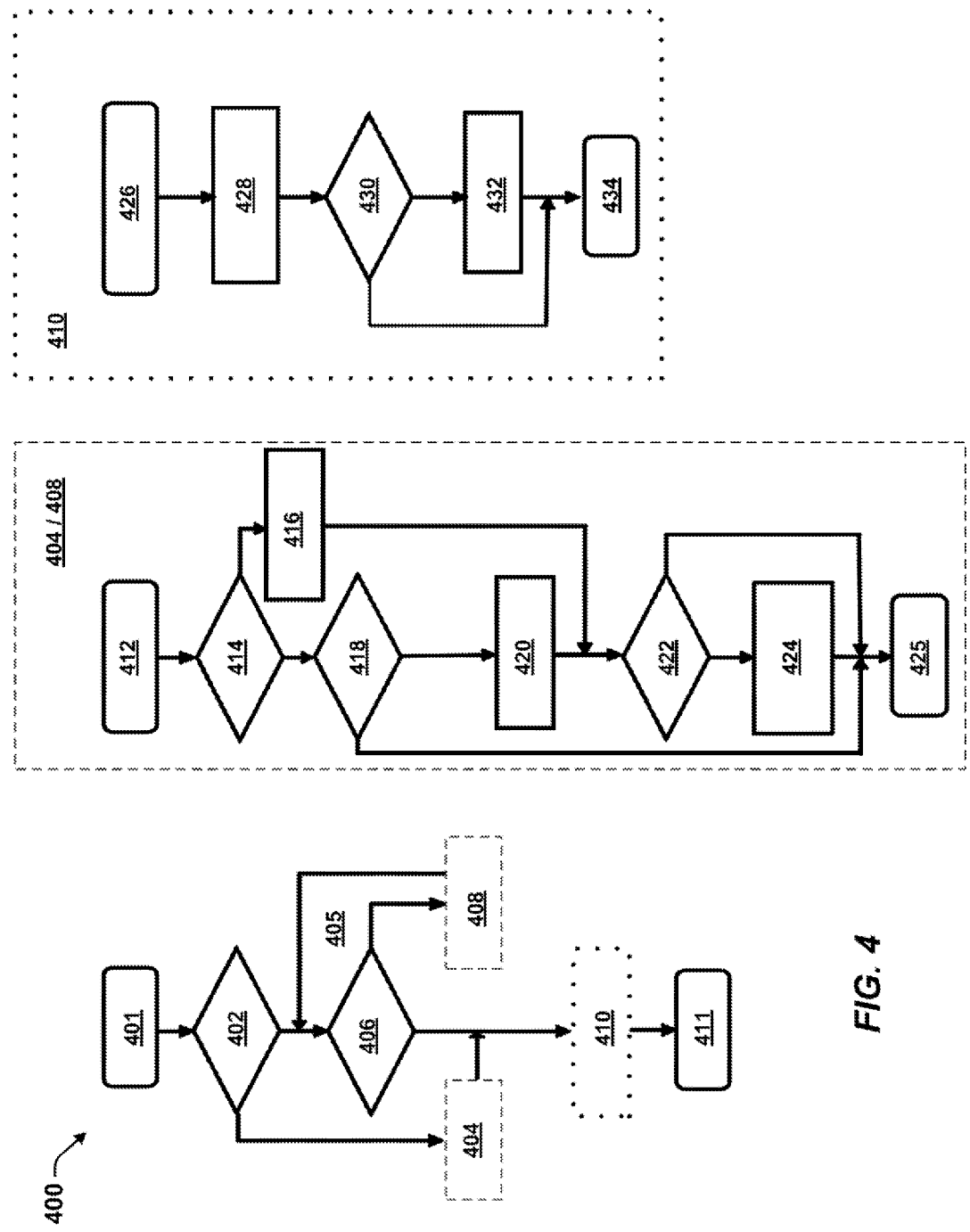
FIG. 4 is a flow chart showing a sub-process, of the process of FIG. 2, for identifying a driver based on communication by the vehicle with a personal device associated with the driver.

FIG. 4 shows an exemplary sub-process 400, of the method 200 of FIG. 2, for processing information associated with a personal device (PD) for identifying the driver of the vehicle. The sub-process 400 starts 401 and flow proceeds to decision diamond 402 whereat a processor (e.g., processor 112), executing computer-readable instructions (e.g., code saved at the storage medium 114), determines whether at least one signal is received from a portable device, wired or wireless personal device, associated with the driver.

As referenced above, the vehicle system 110 includes a transceiver 138, and/or some other suitable device, for scanning an area, including and adjacent the vehicle, for signals transmitted by the personal device implemented as a wireless device 140. As also referenced, the vehicle system 110 can alternatively or in addition include a port (e.g., USB port) for receiving signals from the personal device being connected to the port by wire. The personal device may send signals unprompted or in response to a prompt from the driver or vehicle.

In some embodiments, as part of the function of this first decision diamond 402 of the algorithm 400, in which the processor receives at least one signal from a portable device, the processor determines whether two or more devices are detected. In some situations, a vehicle driver may enter the vehicle with more than one wireless device (e.g., a personal device implemented as a mobile phone and one implemented as a wrist watch), or more than one person will enter the vehicle each carrying a respective wireless device.

If at decision diamond 402 the processor detects only one personal device, then flow proceeds to a routine indicated by block 304 whereat the processor processes the input information received in the signal from the sole personal device. The processing of block 404 is described in further detail below with respect to block 412, as illustrated in the middle flow of FIG. 4.

Once the system 110 has performed the processing of block 404, according to the middle flow of FIG. 4 (acts 412-425), flow proceeds to block 410, in the flow at the right of FIG. 4, whereat the processor identifies the driver based on the information available at the system 110. Particular acts involved with identifying the driver as such are described in the right flow of FIG. 4 (acts 426-434), as indicated in the figure.

If the processor detects multiple personal devices at the decision diamond 402, flow proceeds to a processing loop 405. The processing loop 405 includes a determination 406 of whether there are any more personal devices, from which a signal has been received. If the processor determines at diamond 406 that there is another device to process, flow proceeds in the loop 405 to a routine, including processing input information received in the signal from the other personal device, indicated by block 408, which can be like block 404 of FIG. 4.

In response to the processor determining, after the acts of the loop 405 are performed (e.g., performed a few times), that there are no other personal devices from which the system 110 received a signal, then flow proceeds to block 410, in the flow at the right of FIG. 4, whereat, as mentioned, the processor identifies the driver based on the information available at the system 110, as further described in the right flow of FIG. 4.

Upon identification of a driver at block 410, flow of the sub-process 400 proceeds to end 411 (FIG. 4) and the method 200 of FIG. 2 can then likewise proceed to end 215, or repeat.

As referenced above, at decision blocks 404/408, the processor performs processing in connection with the personal device detected in or adjacent the vehicle system 110. At decision diamond 414, the processor determines whether it recognizes the detected personal device. The personal device is recognized if data was previously stored to, and/or an account created in, the memory 114 in connection with the personal device. Thus, at diamond 414, the processor accesses the memory and compares information received from the personal device to records stored in the memory. The received information can include, for instance, a personal device-specific (e.g., alpha and/or numeric) associated with the personal device.

If the processor determines at diamond 414 that the system 110 does recognize the personal device, then flow proceeds to block 416 whereat the processor determines an identification specific to a user associated with the personal device. The identification can be, for example, a name or other identification (e.g., alpha and/or numeric) specific to a person. From block 416, flow proceeds to decision diamond 422, as shown in FIG. 4 and described further below.

If the processor determines at diamond 414 that the system 110 does not recognize the personal device, then flow proceeds to diamond 418 whereat the processor determines whether to assign a new identification in the system 110 in association with the non-recognized personal device. In one embodiment, the determination includes enquiring of the driver whether they would like the system 110 to assign a new identification as such. The system 110 can make the enquiry and receive reply via an HVI, such as a touch-screen display and/or a speaker/microphone sub-system.

If at diamond 414 the processor determines not to assign a new identification in the system 110 in association with the non-recognized personal device, flow proceeds to exit 425 the routine 404/408.

If at diamond 414 the processor determines to assign a new identification in the system 110 in association with the non-recognized personal device, flow proceeds to block 420 whereat the processor assigns the new identification in the system 110 in association with the personal device. Assigning the new identification can include creating an account, or dedicated memory location, in association with the personal device.

At diamond 422, the processor determines whether the processor recognizes the person to be associated with the new identification (e.g., account) in the system 110. The person is recognized if some processor previously stored data to, and/or created an account, in the memory 114 with respect to the person. Thus, at diamond 422, the processor accesses the memory and compares data identifying the person to records stored in the memory. The data identifying the person can include, for instance, a name or person-specific code (e.g., alpha and/or numeric).

If at diamond 422 the processor determines that the person is not new to the system 110, flow proceeds to exit 425 the routine 404/408. Upon such exit 425, the algorithm 400 returns to the left flow of FIG. 4, and particularly to block 410.

If at diamond 422 the processor determines that the person is new to the system 110, flow proceeds to block 424 whereat the processor creates a new driver account, or profile, in the memory 114 of the system 110 for the new user, or at least creates a driver identification (e.g., alpha-numeric identification). Following creation of the new account, or at least the driver identification, flow proceeds to exit 425 the routine 404/408, from which the algorithm 400 returns to the left flow of FIG. 4, and particularly to block 410.

In one embodiment, the acts of diamond 422 and block 424 can be described in the following terms of this paragraph. The algorithm at diamond 422 determines whether the identified ID from the block 416 or the newly assigned ID at the box 420 is for a new user or driver, and if so, inputs that user into the system at box 424. The algorithm will allow the new user to input information into the system using the HVI identifying that user as a driver and storing pre-sets for the various vehicle systems and devices for that new driver. If the new device has been assigned a new ID at the decision diamond 418 and the assigned ID at box 420 is not for a new user at the decision diamond 422, then the algorithm exits 425 the input device process.

In one embodiment, the function of block 424, including creating a new driver identification, includes the acts of routine 510 described below in connection with FIG. 5.

At block 410, the processor performs the routine shown in the right flow of FIG. 4. The routine begins 426 and proceeds to block 428 whereat the processor selects the driver from a priority list, stored in the memory 114, based on the devices that have been identified in the afore-described acts. If only a single device has been identified in the afore-described acts, then vehicle device pre-sets are provided according to the identified device. Exemplary pre-sets include seat position, radio settings, stiffness of ride (e.g., via suspension-system settings), tuning of vehicle (e.g., engine settings), driving mode (e.g., sport, city, or economy), and vehicle restrictions. Example vehicle restrictions include restricting use of wireless communications, such as texting, restricting driving such as by enforcing a maximum speed or allowing only daylight driving.

If multiple personal devices have been identified, then the algorithm goes to a priority list, stored in the memory 114, to identify which device of the multiple devices has the highest priority, for setting the vehicle devices to the pre-sets associated in the Memory 114 with the highest priority device received.

In some embodiments, the sub-process 400, particularly the routine 410 thereof, includes one or more acts allowing a driver to override the driver identification reached. The vehicle system 110 can determine whether there is an override at diamond 430, such as using an HVI (e.g., touch-screen display or speaker/microphone sub-system). The actual driver may wish to override the decision for various reasons, such as, for example, the actual driver of the vehicle desiring to be a lower priority device at the present time. If an override is not received from the driver at the decision diamond 430, then the algorithm exits 434 the routine 410, because the vehicle pre-sets have been determined for the correct driver, and so can from here proceed to end 411 the sub-process 400. If an override is received at the decision diamond 430, then the processor proceeds at block 432 to input the new driver, identified to or by the vehicle in connection with the override, as the driver (e.g., as a highest-priority driver), and exits 434 the routine 410. Flow can from here proceed to end 411 the sub-process 400.

Third Sub-Process—HVI Processing

Figure 5:
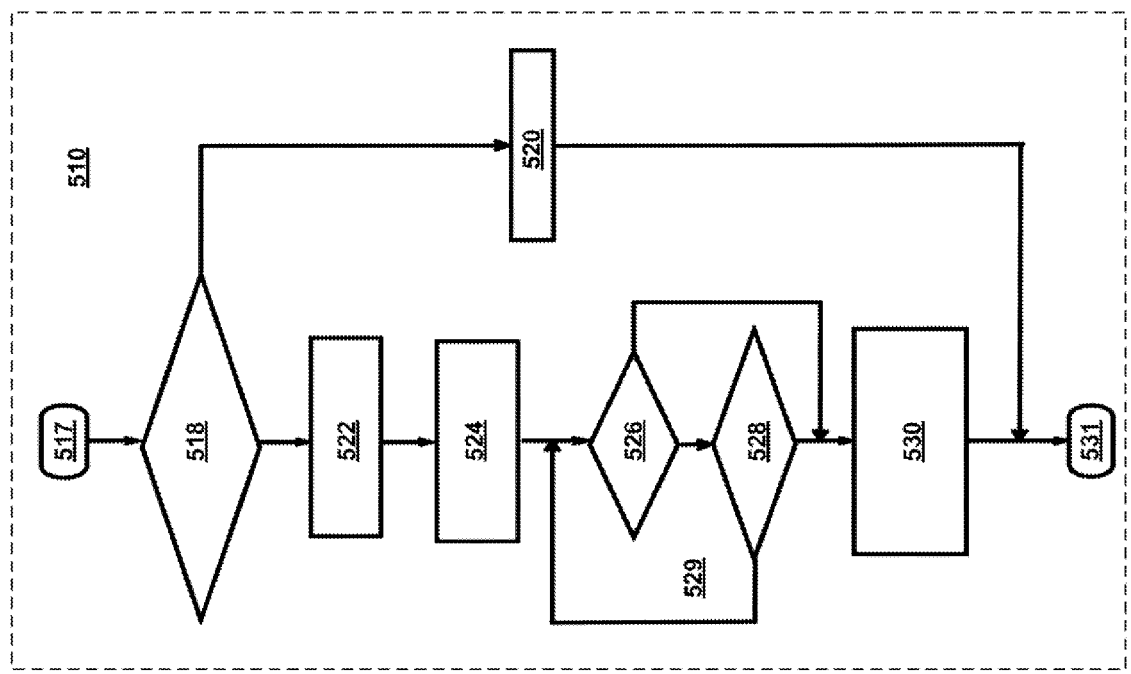
FIG. 5 is a flow chart showing a sub-process, of the process of FIG. 2, for identifying a driver based on information received from the driver by way of a human-machine interface of the vehicle.
Figure 5:
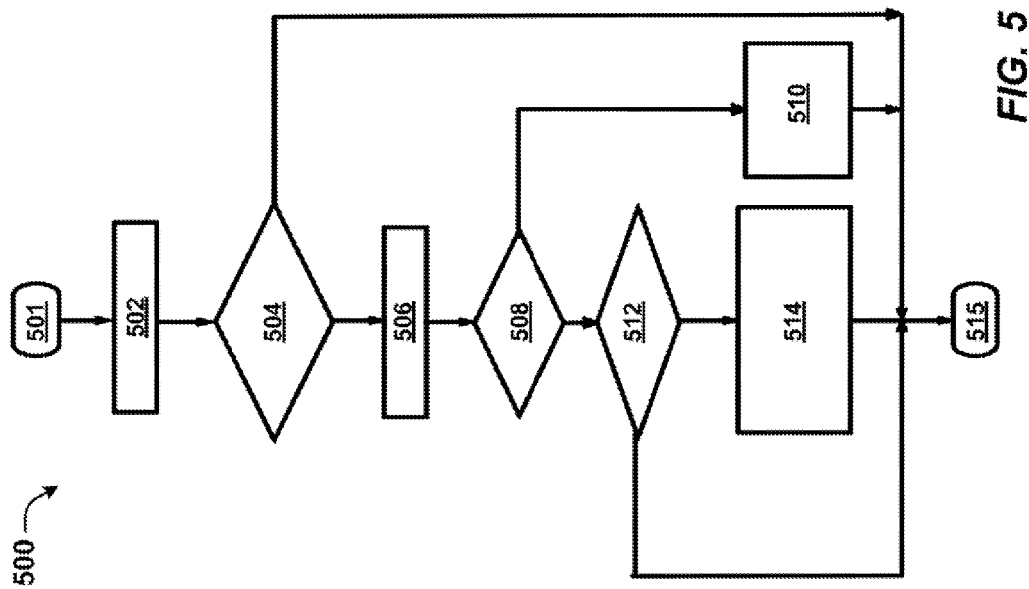

FIG. 5 shows an exemplary sub-process 500, for processing input from a user received by way of a human-vehicle interface (HVI) of the vehicle, of the method 200 of FIG. 2. The sub-process 500 of FIG. 5 starts 501 and flow proceeds to block 502 whereat a processor, executing computer-readable instructions, presents a greeting to the driver. The greeting can be made by way of any HVI, such as a display screen or speaker sub-system.

In one embodiment, the sub-process 500 includes one or more acts like those described above in connection with sub-routine 304, differing by relating to HVI input, here, versus biometric input in sub-routine 304.

At decision diamond 504, the processor determines whether to reselect a driver. In one embodiment, the determination includes presenting an enquiry to the driver as to whether the driver would like the system 110 to reselect a driver—e.g., from a default or preliminarily (up-to-this-point) identified driver, such as a driver determined to be associated with the entry device (e.g., key fob or key). The enquiry can be presented by way of any HVI, such as a touch-screen display or speaker/microphone sub-system. The act can include communicating the default or preliminarily identified driver so that the driver can determine whether to have the system 110 reselect.

If the processor determines at diamond 504 to not reselect a driver, flow proceeds to an end 515 of the sub-process 500, and thus returns to the primary method 200. The driver already identified is the driver that the system 110 determines is the current driver, and the method 200 proceeds to end 215.

If the processor determines at diamond 504 to reselect a driver, flow proceeds to block 506 whereat the processor presents a select-driver option. The option can include, e.g., a driver-selection page presented via a touch-screen display, or driver choices presented via a speaker of a speaker/microphone sub-system. The option may include a list of one or more drivers stored in the memory 114. The list may be presented, for example, by way of a menu type of list presented via screen, or a list of one or more pre-stored drivers presented via speaker. In one embodiment, the processor allows the driver to select from such a list. In one embodiment, in addition or in the alternative, the process allows the driver to input, e.g., via an HVI, driver information, such as their name.

In response to the user indicating their identity at block 506, flow proceeds to diamond 508 whereat the processor determines whether the indicated identity is associated with existing driver account in the system 110, particularly existing driver account in the memory 114. If at decision block 508, the processor determines that the indicated identity is new (i.e., not associated with an existing driver), flow proceeds to a routine, referenced by block 510, for creating a new driver identification, for the driver, in the system 110, particularly in the memory 114. The routine 510 is described further below in connection with its exemplary acts 517-531, as shown by the flow at right of FIG. 5.

Following performance of the sub-routine 510, for creating a new driver identification, flow proceeds to the end 515 of the sub-routine, and the end 215 of the method 200, for implementing settings stored in the memory 114 in connection with the new driver.

If at decision block 508, the processor determines that the indicated identity is not new (i.e., is associated with an existing driver), flow of the sub-process 500 proceeds to diamond 512. At the diamond 512, the processor determines whether the user is authorized to assign a new driver in the system 110. This function can protect against, for instance, a teenager, allowed to use a parents' car but not allowed to change settings or change or create driver accounts, doing so. Authorization can be received from the driver via an HVI and can include requirement of a secret code, such as a password.

If at diamond 512 the processor determines that the driver is not authorized to assign a new driver in the system 110, flow proceeds to the end 515 of the sub-routine, and the end 215 of the method 200, for implementing settings stored in the memory 114 in connection or association with the driver identified prior to the act at diamond 504.

If at diamond 512 the processor determines that driver is authorized to assign a new driver in the system 110, flow proceeds to block 514 whereat the processor reports the re-selected driver to a driver ID controller.

From block 514, flow proceeds to the end 515 of the sub-routine, and the end 215 of the method 200, for implementing settings stored in the memory 114 in connection or association with the driver re-selected (e.g., driver identified in, e.g., acts 504-508).

Fourth Sub-Process—SR Processing

Figure 6:
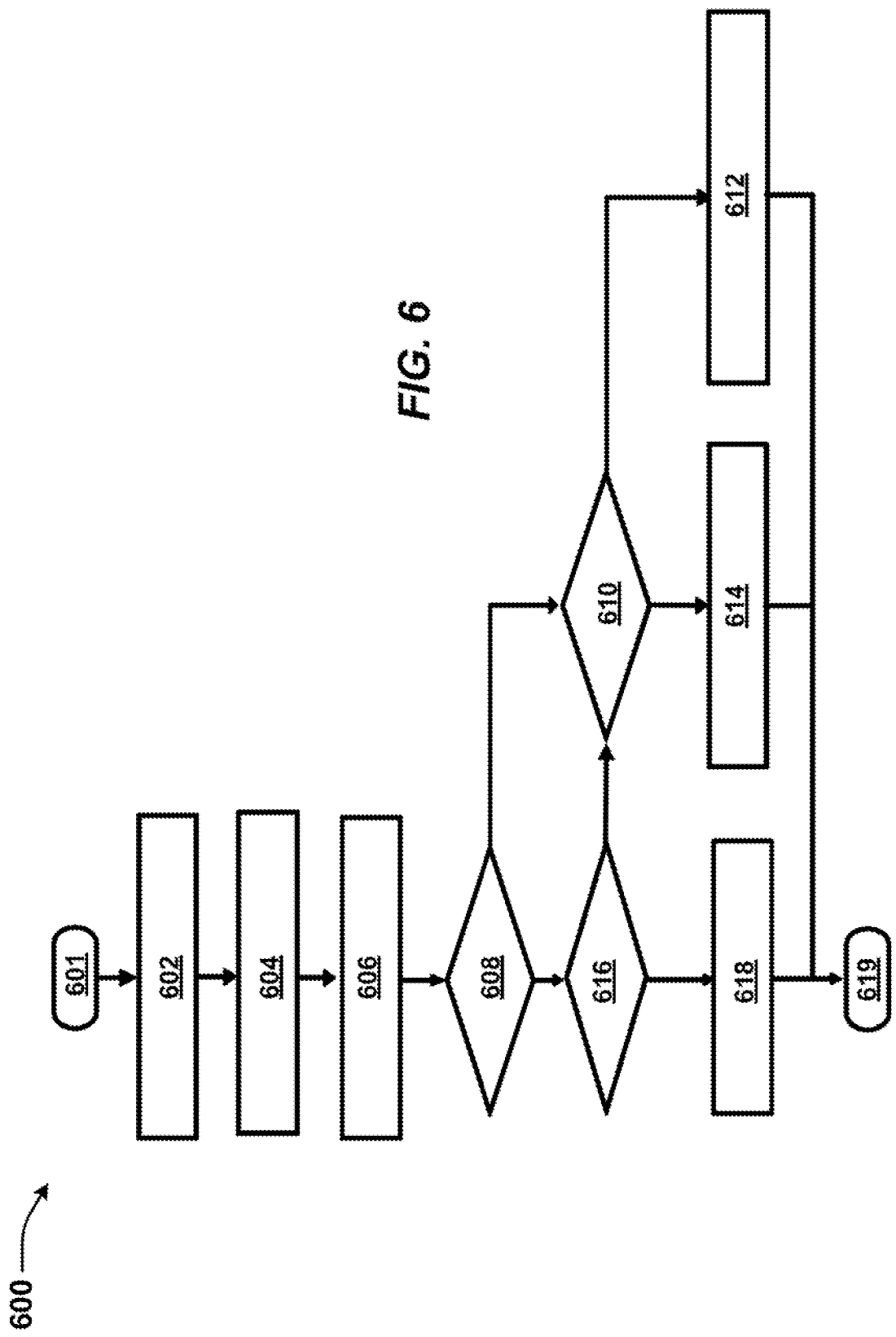
FIG. 6 is a flow chart showing a sub-process, of the process of FIG. 2, for adjusting a pre-determined identification based on information received from the driver by way of a human-machine interface of the vehicle.

FIG. 6 shows an exemplary sub-process 600, for re-adjusting settings, or processing a settings re-adjustment (SR), of the method 200 of FIG. 2. The sub-process 600 starts 601 and flow proceeds to block 602 whereat a processor, executing computer-readable instructions, creates a temporary profile. This act 602 in some embodiments includes storing the temporary profile in the memory 114.

At block 604, the processor reads current vehicle-device settings (e.g., radio setting, seat settings, etc.) and stores them in connection or association with the temporary profile. E.g., the processor stores the settings in the memory 114 to be a part of the temporary profile.

At block 606, the processor analyzes one or more current vehicle device settings (e.g., radio setting, seat settings, etc.). In one embodiment, this act 606 includes comparing the current settings to corresponding settings of one or more profiles already stored in (e.g., activated in) the system 110 in order to determine whether the current driver already has a profile in the system 110.

At decision diamond 608, the processor determines, based on results of the comparing act 606, whether there is a match between the current vehicle device settings and the settings of existing profiles of the memory 114. In a contemplated embodiment, the computer-readable instructions cause the processor to, in the comparison, weigh one or more variables higher than one or more other variables. For instance, the processor could consider a close relationship in seat fore-aft position to be more relevant to determining a match than a relationship or lack thereof of a radio station selection(s).

If the processor determines that there is not a match, flow of the algorithm proceeds to decision diamond 610 whereat the processor determines whether to create a new driver identification or profile. In one embodiment, this function includes the processor enquiring of the vehicle user as to whether they would like to create a new identification. The enquiry can be made, and a response received from the user, via one or more of the HVI, such as a touch-screen sub-system and a speaker/microphone sub-system.

If at diamond 610 the processor determines to not create a new driver identification or profile, the algorithm proceeds to block 612 whereat the processor determines that the current driver will be recognized by the system 110 as an unidentified driver. This act can include adding data to the memory 114 in connection with the temporary profile, and/or adding a tag to the temporarily profile, thereby indicating that the temporary profile is associated with an unidentified driver.

If at diamond 610 the processor determines to create a new driver identification or profile, the algorithm proceeds to block 614. Act 614 can be substantially the same as the act 410 described above regarding the sub-process 400 of FIG. 4. Thus, the processor, when reaching block 614 in the algorithm of the sub-process 600, can perform essentially the same functions described herein with respect to the related act 410.

If the processor determines at diamond 608 that there is a match, flow of the algorithm proceeds to block 616 whereat the processor confirms whether an accurate match has been made. This function in one embodiment includes the processor enquiring of the vehicle user as to whether they are the driver identified by the comparison and match. The enquiry can be made, and a response received from the user, via one or more of the HVI.

The confirmation function of block 616 could be helpful in scenarios such as one involving a family having two sisters wherein one has a stored, first, profile and the second, who does not, is now preparing to drive the vehicle. The second sister may arrange the vehicle to similar settings as those of a profile recorded in the memory 114 for the first sister, such as seat and mirror settings if the sisters are about the same size. In this case, the processor may find a match in the comparison and matching acts 606, 608, though the second sister is not the driver associated with the first profile as it would appear. In this scenario, at diamond 616, the processor presents the second sister with the ability to advise the system that, despite the match found, she is not the first sister as the system 110 estimated may be the case.

If at diamond 616 the processor determines that an identified match is not accurate (e.g., the second sister provides input to the system 110 indicating that she is not associated with the first profile found at act 608), flow proceeds to diamond 610, described above.

If at diamond 616 the processor determines that an identified match is accurate (e.g., the first sister is now driving the car and provides input to the system 110 indicating that she is associated with the first profile found at act 608), flow proceeds to block 618. At block 618, the processor modifies any settings as needed to correspond to those, stored at the memory 114, of the profile identified in the comparison and matching acts 606, 608.

From each of the acts 612, 614, 618 of the bottom row of acts of FIG. 6, the algorithm proceeds to end 619, and so to end 215 or repeat the method 200 of FIG. 2, such as for implementing settings stored in the memory 114 in association with the appropriate driver information—e.g., according to the temporary profile following act 612, according to the new profile following act 614, or according to the matching profile following 618.

Fifth Sub-Process—Entry Device ID

As referenced above, should the higher priority sub-processes 300, 400, 500, 600 be unavailable for identifying the driver, flow of the algorithm of FIG. 2 continues to the sub-process, or function, of block 212. Determining that the higher priority sub-processes are not available includes reaching negative results at each of the corresponding consideration diamonds 206, 208, 210.

At block 212, the processor determines the driver to be a person associated in the system (e.g., database 114) with a remote entry device, such as a key or key fob, used to access the vehicle in connection with act 202.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the following claims.

What is claimed is:

1. A process, performed by a computer processor executing computer-executable instructions stored at a non-transitory computer-readable storage medium, for identifying a vehicle driver according to a pre-determined hierarchy, comprising:
   determining, in a first determination act, whether a first sub-process, of a group of multiple sub-processes, can be used to identify the vehicle driver, wherein the first sub-process is pre-determined to be a most reliable sub-process of the group for identifying the vehicle driver; and
   determining, in a second determination act, only if the first determination act has a negative result, whether a second sub-process of the group can be used to identify the vehicle driver, wherein the second sub-process is pre-determined to be a second-most reliable sub-process of the group for identifying the vehicle driver.

2. The process of claim 1, wherein the first determination act includes determining whether biometric input is received from the driver and, if the biometric input is received, processing the biometric input for determining whether the biometric input corresponds with a driver profile stored at the vehicle.

3. The process of claim 1, wherein one of the first determination act and the second determination act includes determining whether a signal is received from a personal device associated with the driver and, if the signal is received from the personal device, processing the signal for determining whether the personal device corresponds with a driver profile stored at the vehicle.

4. The process of claim 1, further comprising:
   determining, in a third determination act, only if the first determination act and the second determination act both have negative results, whether a third sub-process, of the group, can be used to identify the vehicle driver, wherein the third sub-process is pre-determined to be a third-most reliable sub-process of the group for identifying the vehicle driver.

5. The process of claim 4, wherein one of the second determining act and the third determination act includes comparing one or more first settings, to which the driver has set one or more components of the vehicle, to one or more second settings of a profile stored at the vehicle.

6. The process of claim 4, further comprising determining, in a fourth determination act, only if the first, second, and third determination acts have negative results, whether a fourth sub-process, of the group, can be used to identify the vehicle driver, wherein the fourth sub-process is pre-determined to be a fourth-most reliable sub-process of the group for identifying the vehicle driver.

7. The process of claim 6, wherein the fourth determination act includes identifying the driver based on a vehicle-entry device used by the driver to access the vehicle.

8. The process of claim 6, further comprising, only if the first, second, third, and fourth determination acts have negative results, using a fifth sub-process, of the group, to identify the vehicle driver, wherein the fifth sub-process is pre-determined to be a fifth-most reliable sub-process of the group for identifying the vehicle driver.

9. The process of claim 6, wherein the fifth determination act includes identifying the driver based on a vehicle-entry device used by the driver to access the vehicle.

10. The process of claim 1, further comprising identifying the driver, by way of the second sub-process, in response to the negative result of the first determination act and a positive result of the second determination act.

11. A non-transitory computer-readable storage memory having computer-executable instructions that, when executed by a processor, cause the processor to perform acts, for identifying a vehicle driver, comprising:
    determining, in a first determination act, whether a first sub-process, of a group of multiple sub-processes, can be used to identify the vehicle driver, wherein the first sub-process is pre-determined to be a most reliable sub-process of the group for identifying the vehicle driver; and
    determining, in a second determination act, only if the first determination act has a negative result, whether a second sub-process of the group can be used to identify the vehicle driver, wherein the second sub-process is pre-determined to be a second-most reliable sub-process of the group for identifying the vehicle driver.

12. The non-transitory computer-readable storage memory of claim 11, wherein the first determination act includes determining whether biometric input is received from the driver and, if the biometric input is received, processing the biometric input for determining whether the biometric input corresponds with a driver profile stored at the vehicle.

13. The non-transitory computer-readable storage memory of claim 11, wherein one of the first determination act and the second determination act includes determining whether a signal is received from a personal device associated with the driver and, if the signal is received from the personal device, processing the signal for determining whether the personal device corresponds with a driver profile stored at the vehicle.

14. The non-transitory computer-readable storage memory of claim 11, wherein the acts further comprise:
    determining, in a third determination act, only if the first determination act and the second determination act both have negative results, whether a third sub-process, of the group, can be used to identify the vehicle driver, wherein the third sub-process is pre-determined to be a third-most reliable sub-process of the group for identifying the vehicle driver.

15. The non-transitory computer-readable storage memory of claim 14, wherein one of the second determination act and the third determination act includes comparing one or more first settings, to which the driver has set one or more components of the vehicle, to one or more second settings of a profile stored at the vehicle.

16. The non-transitory computer-readable storage memory of claim 14, wherein the acts further comprise determining, in a fourth determination act, only if the first, second, and third determination acts have negative results, whether a fourth sub-process, of the group, can be used to identify the vehicle driver, wherein the fourth sub-process is pre-determined to be a fourth-most reliable sub-process of the group for identifying the vehicle driver.

17. The non-transitory computer-readable storage memory of claim 14, wherein the acts further comprise, only if the first, second, third, and fourth determination acts have negative results, using a fifth sub-process, of the group, to identify the vehicle driver, wherein the fifth sub-process is pre-determined to be a fifth-most reliable sub-process of the group for identifying the vehicle driver.

18. A system, for identifying a vehicle driver, comprising:
    a tangible processor; and
    a non-transitory computer-readable storage memory having computer-executable instructions that, when executed by a processor, cause the processor to perform acts comprising:
        determining, in a first determination act, whether a first sub-process, of a group of multiple sub-processes, can be used to identify the vehicle driver, wherein the first sub-process is pre-determined to be a most reliable sub-process of the group for identifying the vehicle driver; and
        determining, in a second determination act, only if the first determination act has a negative result, whether a second sub-process of the group can be used to identify the vehicle driver, wherein the second sub-process is pre-determined to be a second-most reliable sub-process of the group for identifying the vehicle driver.

19. The system of claim 18, wherein the instructions, when executed by the processor, further cause the processor to:
    determine, in a third determination act, only if the first determination act and the second determination act both have negative results, whether a third sub-process, of the group, can be used to identify the vehicle driver, wherein the third sub-process is pre-determined to be a third-most reliable sub-process of the group for identifying the vehicle driver; and
    determine, in a fourth determination act, only if the first, second, and third determination acts have negative results, whether a fourth sub-process, of the group, can be used to identify the vehicle driver, wherein the fourth sub-process is pre-determined to be a fourth-most reliable sub-process of the group for identifying the vehicle driver 20. The system of claim 19, wherein the instructions, when executed by the processor, further cause the processor to, only if the first, second, third, and fourth determination acts have negative results, using a fifth sub-process, of the group, to identify the vehicle driver, wherein the fifth sub-process is pre-determined to be a fifth-most reliable sub-process of the group for identifying the vehicle driver.

* * * * *